United States Patent [19]

Kemmler-Sack et al.

[11] Patent Number: 4,928,017

[45] Date of Patent: May 22, 1990

[54] METHOD FOR RECORDING AND REPRODUCING RADIOGRAPHIC IMAGES

[75] Inventors: Sibylle Kemmler-Sack, Tübingen, Fed. Rep. of Germany; Romano Morlotti, Ferrania, Italy; Jürgen Reichardt, Schwab Muenchen, Fed. Rep. of Germany

[73] Assignee: Minnesota Mining and Manufacturing Company, St. Paul, Minn.

[21] Appl. No.: 284,298

[22] Filed: Dec. 14, 1988

[30] Foreign Application Priority Data

Dec. 22, 1987 [IT] Italy ............................ 23154 A/87

[51] Int. Cl.$^5$ ............................................. C09K 11/79
[52] U.S. Cl. ............................ 250/483.1; 252/301.4 F
[58] Field of Search ............... 252/301.4 F; 250/483.1

[56] References Cited

U.S. PATENT DOCUMENTS 3,758,413  9/1973  Peters ........................ 252/301.4 F

FOREIGN PATENT DOCUMENTS 249660  12/1987  European Pat. Off. ...... 252/301.4 F
2234968  1/1973  Fed. Rep. of Germany ... 252/301.4 F
2816069  10/1978  Fed. Rep. of Germany ... 252/301.4 F Primary Examiner—Jack Cooper
Attorney, Agent, or Firm—Donald M. Sell; Walter N. Kirn; Mark A. Litman

[57] ABSTRACT

Phosphors constituted by terbium and/or cerium activated lutetium-gadolinium-yttrium silicates have shown a high visible-light emission efficiency upon exposure to high energy radiation.

Said phosphors are useful in the methods for recording and reproducing high energy radiation images.

1 Claim, No Drawings

METHOD FOR RECORDING AND REPRODUCING RADIOGRAPHIC IMAGES

FIELD OF THE INVENTION

The present invention relates to phosphors for conversion of hard radiation into visible-light, to a process for preparing said phosphors and to the use of said phosphors in converting screens for direct radiography.

BACKGROUND OF THE INVENTION

Some luminescent substances (phosphors), which comprise an inorganic compound (host) activated with element ions (activators), emit light (which is usually visible light but may be also infrared light and it is generally called soft or low energy radiation) upon exposure to hard radiation or high energy radiation, such as x-rays, cathode rays, UV rays.

The soft radiation emission may be either a direct emission, i.e. the phosphor emits light while it is still under irradiation, or a photostimulated emission, i.e. the irradiated phosphor emits light if stimulated by a suitable stimulation light.

These phosphors have different applications. In particular, direct emission phosphors are used in cathode ray tubes (CRT), converting screens for direct radiography, and converting linings for UV lamps. Photostimulated emission phosphors are used in storage panels for digital radiography and in dosimetry.

The intensity of the soft radiation emitted by a phosphor is not the same throughout the light spectrum; each phosphor has its own particular emission spectrum, which comprises one or more peaks and/or bands which are typical of that phosphor.

The performance of a phosphor is generally evaluated by its luminescence, which is the rate between the intensity of the emitted light and the intensity of the hard radiation; it may be evaluated as an overall luminescence (in which case the intensity of the emitted light throughout the whole light spectrum is considered) or as band luminescence (in which case the intensity of the light emitted in a number of bands of the spectrum is considered).

Generally speaking, the overall luminescence is a significant parameter for CRT application, since the emitted light is to be "detected" by human eyes. On the contrary, for radiography applications the relevant luminescence is that in the band of higher sensitivity of either the photographic film (direct radiography) or the photodetector (digital radiography) which are coupled to the phosphor screen or panel for detecting the emitted light.

Therefore, the general task in this field is to find more efficient phosphors, i.e. having the highest possible luminescence.

Among direct emission phosphors known in the art, the most efficient are generally considered the gadolinium oxy-sulfide activated with terbium ($Gd_2O_2S$:Tb), the barium fluoro-chloride activated with europium (BaFCl:Eu), the calcium tungstate ($CaWO_4$), the yttrium tantalate activated with niobium ($YTaO_4$:Nb), the gadolinium tantalate activated with terbium ($GdTaO_4$:Tb).

All these phosphors emit in particular in the blue or blue-green light region.

Other direct emission phosphors are known from the patent literature, such as the phosphors obtained with the following raw materials (after mixing, adding a flux, burning, grinding, washing, drying, sieving, etc): yttrium oxide, silicon dioxide, terbium oxide, dysprosium oxide or praseodimium oxide, barium oxide (see Japanese patent application Ser No. 84-193983); these phosphors should have an yttrium/dysprosium or yttrium/praseodimium silicate structure, even if this fact is not sufficiently clarified in the above mentioned patent application.

SUMMARY OF THE INVENTION

It has been found that high luminescence, upon excitation with hard radiation, is shown by phosphors constituted by terbium and/or cerium activated lutetium-gadolinium-yttrium silicates.

The phosphors of the present invention are useful in radiation recording and reproducing methods. In particular, the phosphors of the present invention are useful in direct radiography methods for recording and reproducing X-ray radiation images.

DETAILED DESCRIPTION OF THE INVENTION

Therefore, the present invention relates to a phosphor characterized by being a terbium and/or cerium activated ternary lutetium-gadolinium-yttrium silicate.

It is worth noting that the compounds usually simply defined as silicates may have at least two different structures: a so-called apathitic structure and a so-called orthosilicatic structure. The two structures, which may be recognized by any suitable conventional method, have a different crystal structure (hexagonal the apathitic one, monoclinic the orthosilicatic one) and also different proportions between the elements; therefore, the two structures might not be identified by one formula only. For example the two structures of a gadolinium silicate should be identified as $Gd_{1.55}SiO_{4.33}$ (apathitic) and $Gd_2SiO_5$ (orthosilicatic).

The orthosilicatic structure has shown the best performance and is therefore the preferred one, according to the present invention. In the following, to indicate said preferred phosphors of the present invention, the term orthosilicatic only will be used, even if the presence therein of minor amounts of phosphors having an apathitic structure, for example amounts less than 20%, preferably less than 10%, is not excluded. For sake of simplicity, also the formulas will be always referred to the orthosilicatic structure.

Preferably, the present invention relates to a phosphor selected from the ternary lutetium-gadolinium-yttrium orthosilicate group represented by the following formula:

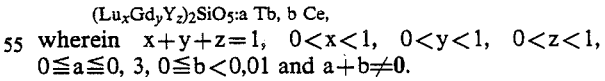

wherein $x+y+z=1$, $0<x<1$, $0<y<1$, $0<z<1$, $0 \leq a \leq 0,3$, $0 \leq b < 0,01$ and $a+b \neq 0$.

Samples of these phosphors have been tested under X-ray irradiation and three luminescence bands have been measured in the ranges 360–460 nm, 460–495 nm and 495–560 nm, which will be referred to as violet luminescence, blue luminescence and green luminescence or violet, blue and green XRL (X-Ray Luminescence), respectively.

In general, the emission spectra of the phosphors of the present invention show peaks at about 450, 416, 387 nm (whose amplitudes decrease by adding terbium), peaks at about 545, 487 nm (whose amplitudes rapidly increase by adding terbium), and a band between 550 and 350 nm (whose amplitude increases by adding cerium). Band and peaks of Tb and Ce seem to be simply superposed each other, without any remarkable mutual effect.

Preferably, the amounts of lutetium, gadolinium and Yttrium and of terbium and cerium are such as to verify the relations: $0.05 \leq x \leq 0.9$, $0.05 \leq y \leq 0.9$, $0.05 \leq z \leq 0.9$, $0.001 \leq a \leq 0.2$, $0 \leq b \leq 0.001$.

More preferably, the above amounts are such as to verify the relations: $0.15 \leq x \leq 0.45$, $0.15 \leq y \leq 0.45$, $0.15 \leq z \leq 0.45$, $0.0008 \leq b \leq 0.0012$.

It has been found that phosphors of this group have a really excellent violet XRL and a good blue and green XRL.

The preparation of the phosphor samples of the present invention has been performed according to a gel process, which will be described in general; specific numerical values are given in the examples.

A solution was prepared by dissolving lutetium, gadolinium and yttrium oxides and terbium and/or cerium oxides in diluted nitric acid. The solution was thoroughly mixed with tetraethylorthosilicate (TEOS) together with alcohol (e.g. ethanol).

Then, a gel was formed by adding an excess of 25% diluted ammonia. The gel was dried for some days at about 70° C. and (after having been divided e.g. in a suitable mill or in an agate mortar) finally fired in a heat resistant crucible (e.g. an alumina or quartz crucible), by heating many times at gradually increasing temperatures (up to 1400°-1600° C.) in air or, possibly, in argon, nitrogen, nitrogen-hydrogen or nitrogen-carbon oxides atmosphere.

Different amounts of raw materials were used to obtain different phosphors, as reported in the following examples.

With the gel process, it has been found that the resulting silicate has predominantly an orthosilicatic structure; the apathitic structure is almost absent or present in very small amounts.

With other processes like the well known flux process and solid state process, it has been found that the amount of the apathitic structure increases, and the performances of the phosphors become worse.

In a further aspect, the present invention relates to a direct radiography method for getting a visible image from an X-ray image of an object, said method comprising the steps of:

(a) causing X-ray radiation to pass through the object, (b) collecting the passed radiation image onto a phosphor screen capable of converting the radiation image into a light image, (c) collecting the light image onto a photographic film capable of being impressed by the light image, characterized in that said phosphor is a terbium and-/or cerium activated lutetium-gadolinium-yttrium silicate, wherein said silicate has preferably an orthosilicatic structure.

In a still further aspect, the present invention relates to a radiation image converting screen which has a fluorescent layer comprising a binder and, dispersed therein, at least one phosphor selected from the group of the above mentioned terbium and/or cerium activated lutetium-yttrium-gadolinium silicates. The fluorescent layer is formed by dispersing the phosphor in the binder to prepare a coating dispersion, and then applying the coating dispersion by a conventional coating method to form a uniform layer. Although the fluorescent layer itself can be a radiation image converting screen if the fluorescent layer is self-supporting, the fluorescent layer is generally provided on a support base to form a radiation image converting screen. Moreover, a protective layer is usually provided on the surface of the fluorescent layer for physically and chemically protecting the fluorescent layer. Furthermore, a primer layer is sometimes provided between the fluorescent layer and the support base to closely bond the fluorescent layer to the support base.

The binder employed in the fluorescent layer of the radiation image converting screen of the present invention, can be, for example, one of the binders commonly used in forming layers: gum arabic, proteins such as gelatin, polysaccharides such as dextran, organic polymer binders such as polyvinylbutyral, polyvinylacetate, nitrocellulose, ethylcellulose, vinylidene-chloride-vinyl-chloride copolymer, polymethylmethacrylate, polybutylmethacrylate, vinyl- chloride-vinylacetate copolymer, polyurethane, cellulose acetate butyrate, polyvinyl alcohol, and the like.

Generally, the binder is used in an amount of 0.01 to 1 part by weight per one part by weight of the lutetium-yttrium-gadolinium silicate phosphor above. However, from the viewpoint of the sensitivity and the sharpness of the screen obtained, the amount of the binder should preferably be small. Accordingly, in consideration of the sensitivity and sharpness of the screen, as well as of the easiness of application of the coating dispersion, the binder is preferably used in an amount of 0.03 to 0.2 parts by weight per one part by weight of the phosphor. The thickness of the fluorescent layer is generally within the range of 10 $\mu$m to 1 mm.

In the radiation image converting screen of the present invention, the fluorescent layer is generally coated on a support base. As support bases, various materials such as polymer material, glass, wool, cotton, paper, metal, or the like can be used. From the viewpoint of handling the screen, the support base should preferably be processed into a flexible sheet or roll. In this connection, the support base is preferable either a plastic film (such as a cellulose triacetate film, polyester film, polyethylene terephthalate film, polyamide film, polycarbonate film, or the like), or ordinary paper or processed paper (such as a photographic paper, baryta paper, resincoated paper, pigment-containing paper which contains a pigment such as titanium dioxide, or the like). The support base may have, coated thereon, a primer layer (the surface on which the fluorescent layer is provided) for the purpose of holding the fluorescent layer tightly. As the material of the primer layer, an ordinary adhesive can be used. In order to coat a fluorescent layer on the support base or on the primer layer, a coating dispersion comprising the lutetium-gadolinium-yttrium silicate phosphor above dispersed in a binder may be directly applied to the support base or to the primer layer.

Further, in the radiation image converting screen of the present invention, a protective layer for physically and chemically protecting the fluorescent layer is generally provided on the surface of the fluorescent layer intended for exposure (on the side opposite the support base). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such as nitrocellulose, ethylcellulose, cellulose acetate, polyester, polyethylene terephthalate, and the like can be used.

The radiation image converting screen of the present invention may be colored with a dye. Further, the fluorescent layer of the radiation image converting screen of the present invention may contain a white powder dispersed therein. By using a dye or a white powder, a radiation image converting screen which provides an image of high sharpness can be obtained.

The present invention will be now illustrated in greater details by reference to the following examples.

EXAMPLE 1

The following starting materials were used:

| | | |
|---|---|---|
| $Lu_2O_3$ | 0.5750 | grams |
| $Gd_2O_3$ | 1.4500 | grams |
| $Y_2O_3$ | 1.0161 | grams |
| $Tb_2O_{3.5}$ | 0.0187 | grams |
| $CeO_2$ | 0.0014 | grams |
| TEOS | 2.0830 | grams |

The first five materials were dissolved in a mixture of $H_2O$ and $HNO_3$. The solution, kept under stirring, was added with the same volume of ethyl alcohol and TEOS.

A gel was precipitated by adding $NH_4OH$, and dried for 3 days at 70° C. The dried gel was then treated for 2 h at 200° C., 2 h at 300° C., 2 h at 500° C., 2 h at 700° C., 100 h at 1300° C. and 4 h at 1400° C. During the 100 h period at 1300° C., the material was cooled at room temperature and homogenized in an agate mortar three times.

Finally, the material was cooled at room temperature.

The resulting phosphor may be represented by the following formula:

$$(Lu_{0.15}Gd_{0.4}Y_{0.45})_2SiO_5{:}0.01Tb, 0.001Ce$$

EXAMPLE 2

The following starting materials were used:

| | | |
|---|---|---|
| $Lu_2O_3$ | 1.1500 | grams |
| $Gd_2O_3$ | 1.4500 | grams |
| $Y_2O_3$ | 0.6774 | grams |
| $Tb_2O_{3.5}$ | 0.1870 | grams |
| $CeO_2$ | 0.0014 | grams |
| TEOS | 2.0830 | grams |

The first five materials were dissolved in a mixture of $H_2O$ and $HNO_3$. The solution, kept under stirring, was added to the same volume of ethyl alcohol and TEOS.

A gel was precipitated by adding $NH_4OH$, and dried for 3 days at 70° C. The dried gel was then treated for 2 h at 200° C., 2 h at 300° C., 2 h at 500° C., 2 h at 700° C., 100 h at 1300° C. and 4 h at 1400° C. During the 100 h period at 1300° C., the material was cooled at room temperature and homogenized in an agate mortar three times.

Finally, the material was cooled to room temperature.

The resulting phosphor may be represented by the following formula:

$$(Lu_{0.3}Gd_{0.4}Y_{0.3})_2SiO_5{:}0.1Tb, 0.001Ce$$

EXAMPLE 3

The following starting materials were used:

| | | |
|---|---|---|
| $Lu_2O_3$ | 1.7250 | grams |
| $Gd_2O_3$ | 1.4500 | grams |
| $Y_2O_3$ | 0.3387 | grams |
| $Tb_2O_{3.5}$ | 0.0935 | grams |
| $CeO_2$ | 0.0014 | grams |
| TEOS | 2.0830 | grams |

The first five materials were dissolved in a mixture of $H_2O$ and $HNO_3$. The solution, kept under stirring, was added with the same volume of ethyl alcohol and TEOS.

A gel was precipitated by adding $NH_4OH$, and dried for 3 days at 70° C. The dried gel was then treated for 2 h at 200° C., 2 h at 300° C., 2 h at 500° C., 2 h at 700° C., 100 h at 1300° C. and 4 h at 1400° C. During the 100 h period at 1300° C., the material was cooled at room temperature and homogenized in an agate mortar three times.

Finally, the material was cooled to room temperature.

The resulting phosphor may be represented by the following formula:

$$(Lu_{0.45}Gd_{0.4}Y_{0.15})_2SiO_5{:}0.05Tb, 0.001Ce$$

EXAMPLE 4

Powders of the phosphors were irradiated with 70 $KV_p$ and 30 mA X-ray radiation and the emitted light collected, with a S-20 type EMI photomultiplier, in the spectral ranges of 360–460 nm (Violet region), 460–495 nm (Blue region) and 495–560 nm (Green region). In each spectral range, the ratio between the integrated light intensity emitted by the powder sample and that of the reference $Gd_2SiO_5{:}0.01Tb, 0.001Ce$ phosphor A was determined (said ratio indicated as XRLE, that is X-Ray Luminescence Efficiency).

The following Table 1 reports the XRLE values in the indicated spectral ranges.

TABLE 1

| | Phosphor $(Lu_xGd_yY_z)_2SiO_5{:}aTb,bCe$ | | | | | XRLE | | |
|---|---|---|---|---|---|---|---|---|
| | x | y | z | a | b | Violet | Blue | Green |
| 1 | 0.45 | 0.40 | 0.15 | 0.01 | 0.001 | 7.7 | 2.5 | 1.5 |
| 2 | 0.45 | 0.40 | 0.15 | 0.05 | 0.001 | 5.0 | 9.0 | 5.5 |
| 3 | 0.30 | 0.40 | 0.30 | 0.01 | 0.001 | 7.7 | 2.5 | 1.5 |
| 4 | 0.30 | 0.40 | 0.30 | 0.05 | 0.001 | 2.7 | 6.5 | 5.0 |
| 5 | 0.30 | 0.40 | 0.30 | 0.10 | 0.001 | 2.3 | 6.0 | 6.0 |
| 6 | 0.15 | 0.40 | 0.45 | 0.01 | 0.001 | 7.7 | 2.5 | 1.5 |
| 7 | 0.15 | 0.40 | 0.45 | 0.05 | 0.001 | 1.3 | 4.0 | 2.5 |
| 8 | 0.15 | 0.40 | 0.45 | 0.10 | 0.001 | 2.3 | 5.5 | 5.5 |
| 9 | 0.15 | 0.40 | 0.45 | 0.20 | 0.001 | 2.0 | 5.0 | 5.0 |
| A | 0.00 | 1.00 | 0.00 | 0.01 | 0.001 | 1.0 | 1.0 | 1.0 |

We claim:
1. A method of direct radiography for getting a radiograph from an X-ray image of an object, comprising the steps of:
(a) causing an X-ray radiation to pass through the object,
(b) collecting the passed radiation image onto a phosphor screen containing a phosphor capable of converting the radiation image into a light image,
(c) collecting the light image onto a photographic film capable of being impressed by the light image, said method being further characterized in that said phosphor is a terbium and cerium activated ternary lutetium-gadolinium-yttrium orthosilicate phosphor according to the formula:

$(Lu_xGd_yY_z)_2SiO_5: aTb, bCe$ wherein $x+y+z=1$, $0.15 \leq x \leq 0.4.5$, $0.15 \leq y \leq 0.45$, $0.15 \leq z \leq 0.45$, $0.01 \leq a \leq 0.2$, $0.0008 \leq b \leq 0.0012$.

* * * * *

UNITED STATES PATENT AND TRADEMARK OFFICE
CERTIFICATE OF CORRECTION

PATENT NO. : 4,928,017

DATED : May 22, 1990

INVENTOR(S) : Kemmler-Sack, Morlotti and Reichardt

It is certified that error appears in the above-identified patent and that said Letters Patent is hereby corrected as shown below:

Column 3, line 8, "$0 \leq b \leq 0.001$" should be --$0 \leq b \leq 0.01$--.

Signed and Sealed this

Twenty-ninth Day of October, 1991

*Attest:*

HARRY F. MANBECK, JR.

*Attesting Officer*      *Commissioner of Patents and Trademarks*